United States Patent
Park et al.

(10) Patent No.: US 12,360,409 B2
(45) Date of Patent: Jul. 15, 2025

(54) OPTICAL PATH CONTROL MEMBER AND DISPLAY DEVICE COMPRISING SAME

(71) Applicant: LG INNOTEK CO., LTD., Seoul (KR)

(72) Inventors: Jin Gyeong Park, Seoul (KR); Jong Sik Lee, Seoul (KR); Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/702,520

(22) PCT Filed: Oct. 14, 2022

(86) PCT No.: PCT/KR2022/015591
§ 371 (c)(1),
(2) Date: Apr. 18, 2024

(87) PCT Pub. No.: WO2023/068666
PCT Pub. Date: Apr. 27, 2023

(65) Prior Publication Data
US 2024/0411162 A1 Dec. 12, 2024

(30) Foreign Application Priority Data
Oct. 18, 2021 (KR) .................. 10-2021-0138531

(51) Int. Cl.
*G02F 1/13* (2006.01)
*G02F 1/1339* (2006.01)
(Continued)

(52) U.S. Cl.
CPC .......... *G02F 1/1323* (2013.01); *G02F 1/1339* (2013.01); *G02F 1/134309* (2013.01); *G02F 1/1347* (2013.01)

(58) Field of Classification Search
CPC ........ G02F 1/1679; G02F 1/167; G09G 3/344
See application file for complete search history.

(56) References Cited

U.S. PATENT DOCUMENTS 8,027,081 B2  9/2011  Danner et al.
8,928,222 B2  1/2015  Kim et al.
(Continued)

FOREIGN PATENT DOCUMENTS

KR      100777700 B1 * 11/2007
KR   10-2012-0033790 A     4/2012
(Continued)

OTHER PUBLICATIONS

International Search Report dated Jan. 19, 2023 in International Application No. PCT/KR2022/015591.
(Continued)

*Primary Examiner* — Alexander P Gross
(74) *Attorney, Agent, or Firm* — Saliwanchik, Lloyd & Eisenschenk

(57) ABSTRACT

An optical path control member according to an embodiment includes a first substrate; a first electrode disposed on the first substrate; a second substrate disposed on the first substrate; a second electrode disposed under the second substrate; a light conversion unit disposed between the first electrode and the second electrode; a first sealing part formed in a first cutting region formed by cutting the second substrate, the second electrode, and the light conversion unit, and a second sealing part formed in a second cutting region; and a connection electrode disposed adjacent to the second sealing part, and wherein the second sealing part includes a plurality of patterns spaced apart from each other.

20 Claims, 14 Drawing Sheets

(51) Int. Cl.
G02F 1/1343 (2006.01)
G02F 1/1347 (2006.01)

(56) References Cited

U.S. PATENT DOCUMENTS

2014/0104676 A1* 4/2014 Suh .................. G02F 1/1679
                                                    29/846
2014/0307407 A1   10/2014 Han
2018/0150161 A1*  5/2018 Xu ..................... G02B 5/30
2019/0162997 A1*  5/2019 Asakura ............. G02F 1/1343
2019/0394180 A1   12/2019 Spahn et al.
2021/0088869 A1*  3/2021 Hara ................. G02F 1/1303

FOREIGN PATENT DOCUMENTS

| KR | 20120089518 A   | * | 8/2012  |
| KR | 10-2014-0123778 A |   | 10/2014 |
| KR | 10-2018-0004879 A |   | 1/2018  |
| KR | 10-2019-0050136 A |   | 5/2019  |
| KR | 10-2019-0125412 A |   | 11/2019 |
| KR | 10-2020-0012683 A |   | 2/2020  |
| KR | 10-2021-0041847 A |   | 4/2021  |
| KR | 10-2021-0042627 A |   | 4/2021  |

OTHER PUBLICATIONS

Office Action dated Feb. 2, 2025 in Korean Application No. 10-2021-0138531.

* cited by examiner

FIG. 16
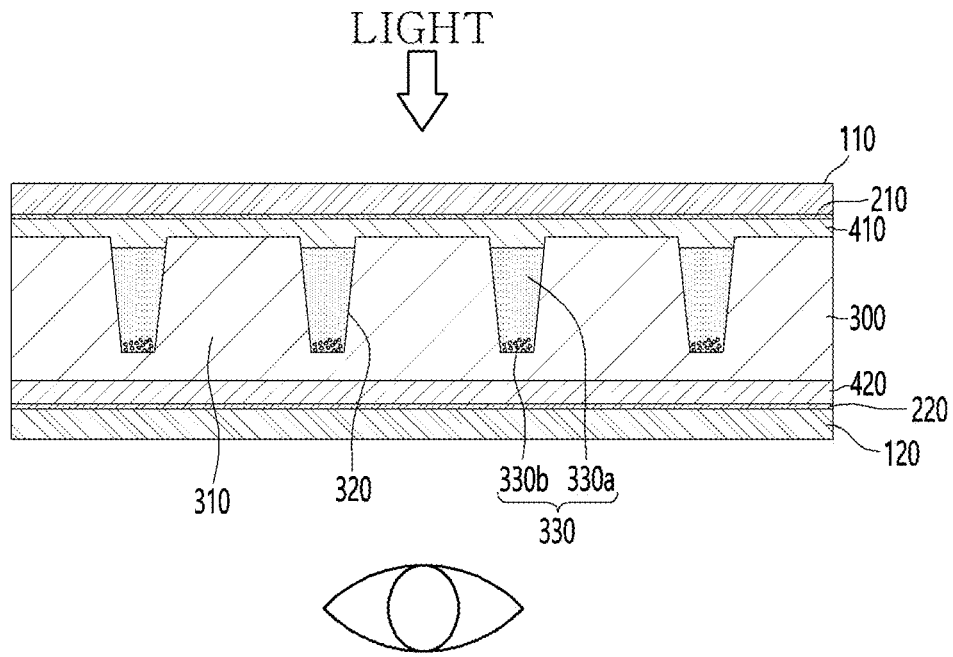
PUBLIC MODE
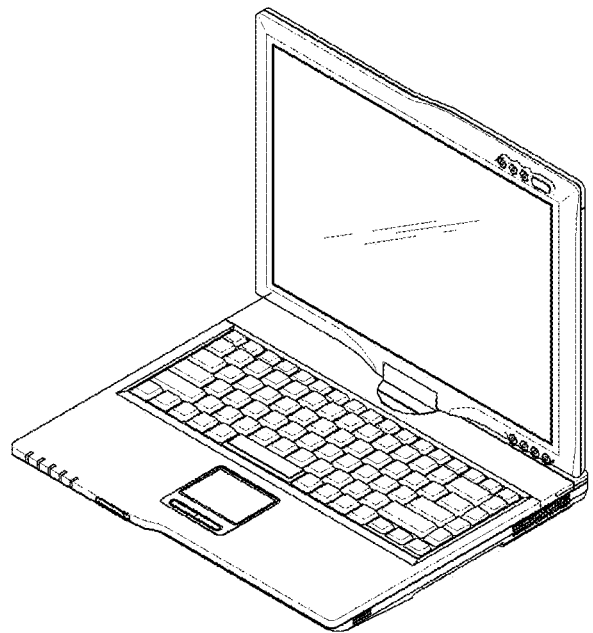

FIG. 17
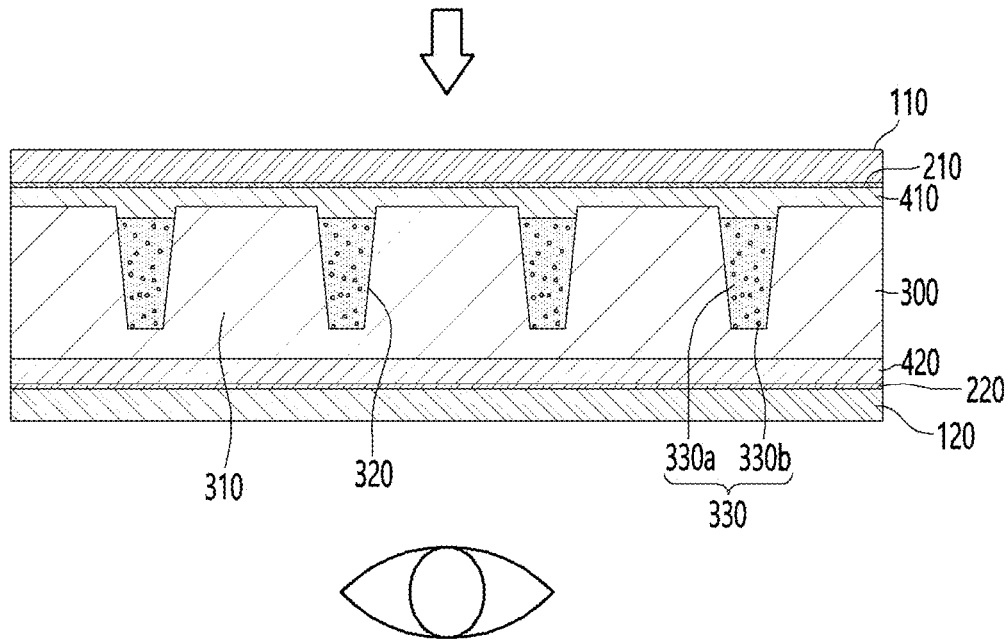
LIGHT BLOCKING MODE
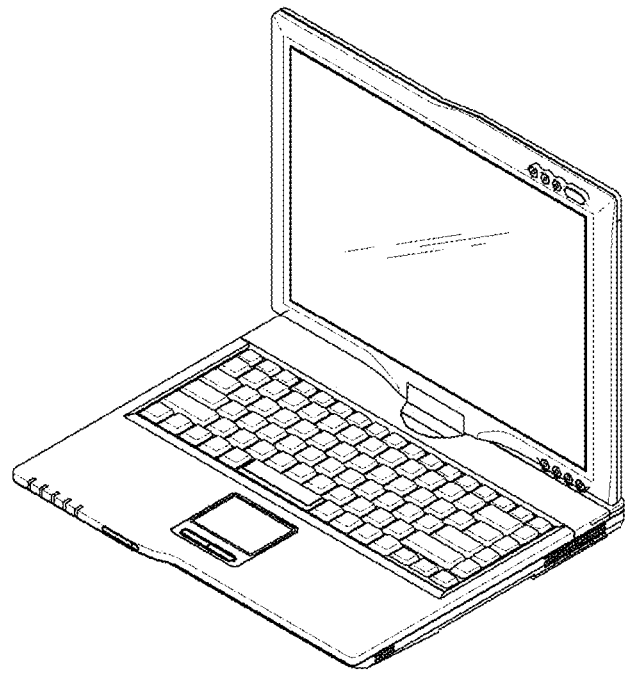

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2022/015591, filed Oct. 14, 2022, which claims the benefit under 35 U.S.C. § 119 of Korean Application No. 10-2021-0138531, filed Oct. 18, 2021, the disclosures of each of which are incorporated herein by reference in their entirety.

TECHNICAL FIELD

An embodiment relates to an optical path control member, and to a display device including the same.

BACKGROUND ART

A light blocking film is an optical path control member that blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the optical path control member may be used for the window of a vehicle, building or the like to shield outside light partially to inhibit glare, or to inhibit the inside from being visible from the outside.

That is, the optical path control member may be an optical path control member that controls the movement path of light to block light in a specific direction and transmit light in a specific direction. Accordingly, it is possible to control the viewing angle of the user by controlling a transmission angle of the light by the optical path control member.

Meanwhile, such an optical path control member may be divided into a light blocking film that can always control the viewing angle regardless of the surrounding environment or the user's environment and a switchable light blocking film that allow the user to turn on/off the viewing angle control according to the surrounding environment or the user's environment.

Such an optical path control member film may be implemented by converting a pattern portion into a light transmitting part and a light blocking part by filling the inside of the pattern portion with a light conversion material including particles that may move when a voltage is applied and a dispersion liquid for dispersing the particles and by dispersing and aggregating the particles.

At this time, in order to apply voltage to the optical path control member, an electrode of the optical path control member must be connected to an external power source. This connection part is an electrode connection part and can be defined as a bezel region rather than a region that controls the viewing angle in a display device.

Meanwhile, the optical path control member can seal the light conversion material by cutting one side of the optical path control member and filling the cut region with a sealing material to form a sealing part.

Accordingly, a size of a region in which the electrode connection part and the electrode are connected may be limited by the sealing part. As a result, the voltage applied from the external power source is not easily transmitted to the light conversion material disposed inside the sealing part, so driving characteristics may deteriorate.

In addition, space constraints may occur in that the location of the electrode connection part must be placed only toward the corner region of the optical path control member.

Accordingly, an optical path control member with a new structure that can solve the above problems is required.

DISCLOSURE

Technical Problem

The embodiment provides an optical path control member capable of improving a degree of freedom with respect to a position of an electrode connection part and having improved reliability.

Technical Solution

An optical path control member according to an embodiment includes a first substrate; a first electrode disposed on the first substrate; a second substrate disposed on the first substrate; a second electrode disposed under the second substrate; a light conversion unit disposed between the first electrode and the second electrode; a first sealing part formed in a first cutting region formed by cutting the second substrate, the second electrode, and the light conversion unit, and a second sealing part formed in a second cutting region; and a connection electrode disposed adjacent to the second sealing part, and wherein the second sealing part includes a plurality of patterns spaced apart from each other.

Advantageous Effects

An optical path control member according to an embodiment may include a sealing part that seals a light conversion material. The sealing part may include a first pattern portion and a second pattern portion spaced apart in a first direction and a second direction. Accordingly, a conduction region in which a connection electrode disposed in an effective region and a second electrode disposed in the effective region are electrically connected may increase. That is, both a first separation region in which patterns of the first pattern portion and the second pattern portion are spaced apart in a first direction and a second separation region in which patterns of the first pattern portion and the second pattern portion are spaced apart in a second direction may be formed as conductive regions.

That is, the conduction region in which the second electrode and the connection electrode are connected can be increased while sealing the light conversion material disposed inside the accommodating part by the sealing part.

Accordingly, since the conduction region of the connection electrode and the second electrode is increased, power transmitted from an outside can be easily and quickly transmitted from a non-effective region to an effective region. Accordingly, driving characteristics of the optical path control member can be improved.

Additionally, even if the connection electrode is formed at various positions, the second electrode and the connection electrode can be easily connected to each other. Accordingly, the degree of freedom in the position of the connection electrode can be improved.

DESCRIPTION OF DRAWINGS

FIGS. 16 to 18 are views for describing one embodiment of the display device to which the optical path control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below may be a switchable light blocking film that operates in a share mode and a light blocking mode depending on the supply of power.

Figure 1:
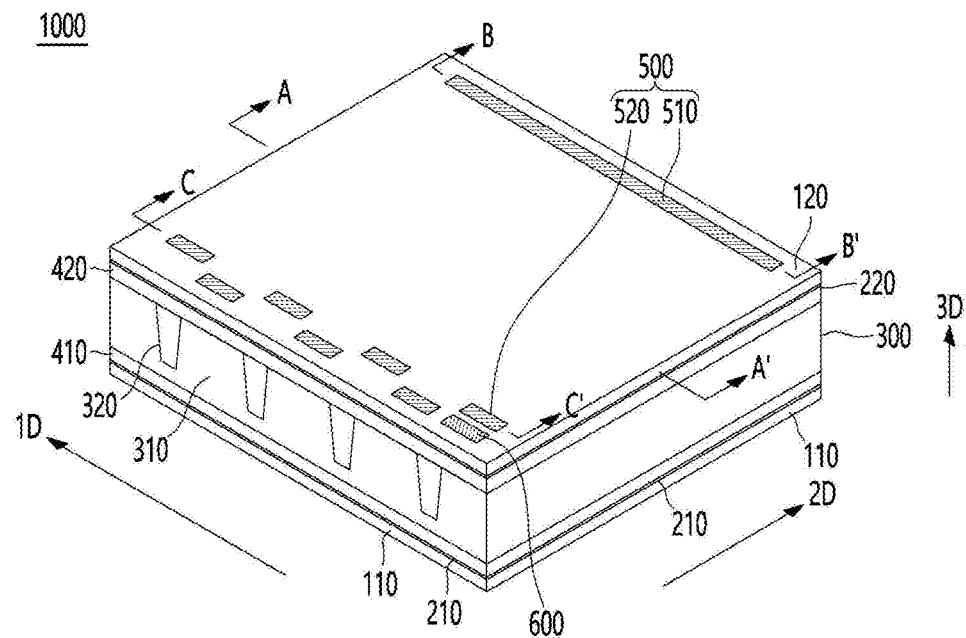
FIG. 1 is a diagram showing a perspective view of an optical path control member according to an embodiment.

FIG. 1 is a diagram showing a perspective view of an optical path control member according to an embodiment.

Referring to FIG. 1, an optical path control member 1000 according to the first embodiment may include a first substrate 110, a second substrate 120, a first electrode 210, a second electrode 220, and a light conversion unit 300.

The first substrate 110 and the second substrate 120 may be rigid or flexible.

In addition, the first substrate 110 and the second substrate 120 may be transparent. For example, the first substrate 110 and the second substrate 120 may include a transparent substrate capable of transmitting light.

The first substrate 110 and the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS). This is only an example, but the embodiment is not limited thereto.

In addition, the first substrate 110 and the second substrate 120 may be a flexible substrate having flexible characteristics.

Further, the first substrate 110 and the second substrate 120 may be a curved or bended substrate. That is, the optical path control member including the first substrate 110 and the second substrate 120 may also be formed to have flexible, curved, or bent characteristics. Accordingly, the optical path control member according to the embodiment may be changed to various designs.

The first electrode 210 and the second electrode 220 may include a transparent conductive material. For example, the first electrode 210 and the second electrode 220 may include a conductive material having a light transmittance of about 80% or more. As an example, the first electrode 210 and the second electrode 220 may include a metal oxide such as indium tin oxide, indium zinc oxide, copper oxide, tin oxide, zinc oxide, titanium oxide, etc.

Alternatively, the first electrode 210 and the second electrode 220 may include various metals to realize low resistance. For example, the first electrode 210 and the second electrode 220 may include at least one metal of chromium (Cr), nickel (Ni), copper (Cu), aluminum (Al), silver (Ag), molybdenum (Mo), gold (Au), titanium (Ti), and alloys thereof.

The first electrode 210 and the second electrode 220 may be arranged in areas of same or different sizes. Here, the meaning of being the same may include differences due to process tolerances.

A connection electrode 600 may be disposed on the first substrate 110 and the second substrate 120, respectively. In detail, a first connection electrode may be disposed on the first substrate 110 to expose the first electrode 210 by removing a buffer layer 410. Additionally, a second connection electrode may be disposed on the second substrate 120 to expose the second electrode 220 by removing an adhesive layer 420.

Additionally, part or all of the second substrate, the second electrode, and the light conversion unit may be cut to form a cutting region, and a conductive material may be filled the inside of the cutting region. By this, the second connection electrode can be formed.

The optical path control member may be electrically connected to an external printed circuit board or flexible printed circuit board through the first connection electrode and the second connection electrode.

For example, a pad part may be disposed on the first connection electrode and the second connection electrode. A conductive adhesive may be disposed between the pad part and the printed circuit board. The conductive adhesive may include at least one of an anisotropic conductive film (ACF) and an anisotropic conductive paste (ACP). Accordingly, the optical path control member and the printed circuit board can be connected.

Alternatively, a conductive adhesive may be disposed directly between the first connection electrode, the second connection electrode, and the printed circuit board without a separate pad part.

The light conversion unit 300 may be disposed between the first substrate 110 and the second substrate 120. In detail, the light conversion unit 300 may be disposed between the first electrode 210 and the second electrode 220.

A buffer layer 410 may be disposed between the light conversion unit 300 and the first electrode 210. The buffer layer 410 can improve the adhesion between the first electrode 220 and the light conversion unit 300 containing other materials. That is, the buffer layer 410 may be a primer layer disposed between the light conversion unit 300 and the first electrode 210.

An adhesive layer 420 may be disposed between the light conversion unit 300 and the second electrode 220. The light conversion unit and the second electrode 220 may be adhered through the adhesive layer 420.

The buffer layer 410 and the adhesive layer 420 may include a transparent material capable of transmitting light. In other words, the buffer layer 410 may include a transparent resin, and the adhesive layer 420 may include an optically clear adhesive (OCA).

The optical path control member may extend in a first direction 1D, a second direction 2D, and a third direction 3D. That is, the substrate, electrode, and light conversion unit constituting the optical path control member may extend in the first direction 1D, the second direction 2D, and the third direction 3D, respectively.

In detail, the optical path control member may include a first direction 1D corresponding to a longitudinal or width direction of the optical path control member, a second direction 2D extending in a direction different from the first direction 1D and corresponding to the longitudinal or width direction of the optical path control member, and a third direction 3D corresponding to a thickness direction of the optical path control member extending in a direction different from the first direction 1D and the second direction 2D.

For example, the first direction 1D may be defined as a longitudinal direction of the optical path control member, the second direction 2D may be defined as a width direction perpendicular to the first direction 1D, and the third direction 3D may be defined as a thickness direction of the optical path control member. Alternatively, the first direction 1D may be defined as the width direction of the optical path control member, the second direction 2D may be defined as a longitudinal direction of the optical path control member perpendicular to the first direction 1D, and the third direction 3D may be defined as the thickness direction of the optical path control member.

Hereinafter, for convenience of explanation, the first direction 1D will be described as the longitudinal direction of the optical path control member, the second direction 2D will be described as the width direction of the optical path control member, and the third direction 3D will be described as the thickness direction of the optical path control member.

Figure 2:
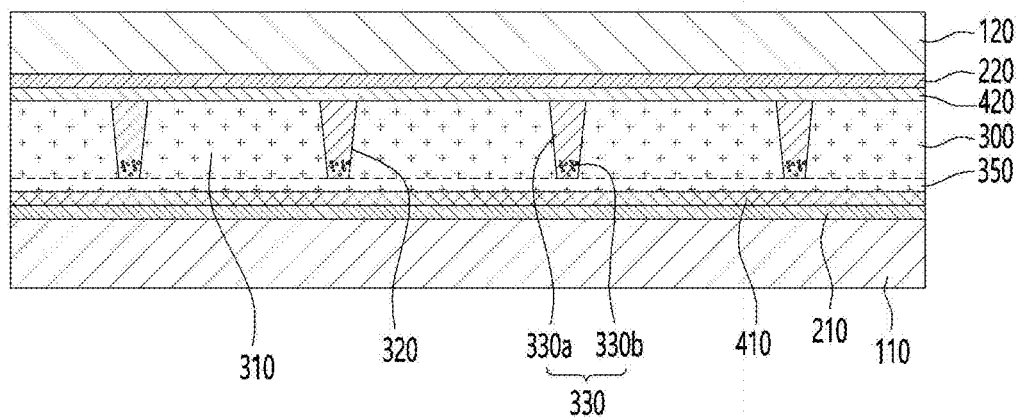
FIGS. 2 and 3 are cross-sectional views taken along a A-A' region of FIG. 1.
Figure 3:
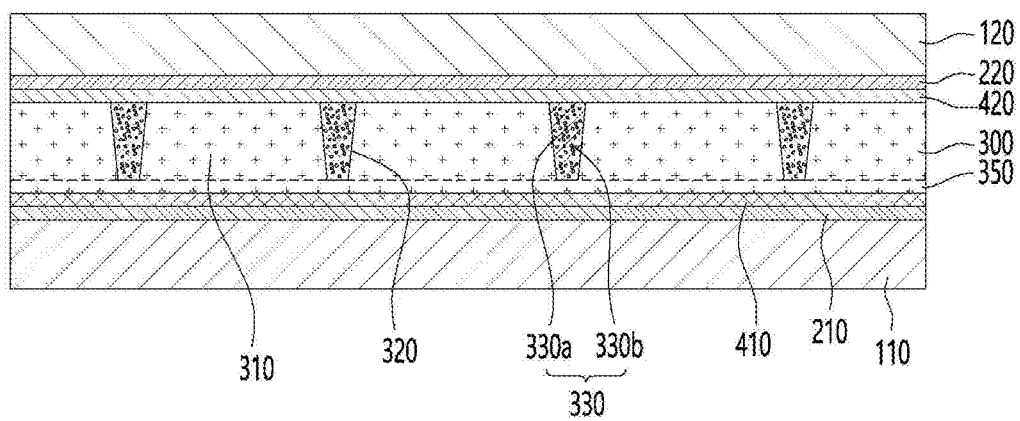

FIGS. 2 and 3 are cross-sectional views taken along a A-A' region of FIG. 1.

Referring to FIGS. 2 and 3, the light conversion unit 300 may include a plurality of partition wall parts 310, a plurality of accommodating parts 320, and a base portion 350.

The light conversion unit 300 may include a plurality of partition wall parts 310 and the accommodating part 320. Additionally, the partition wall part 310 and the accommodating part 320 may be arranged alternately. That is, one accommodating part 320 can be disposed between two adjacent partition wall parts 310, and one partition wall part 310 can be disposed between two adjacent accommodating parts 320.

FIGS. 2 and 3 show four accommodating parts, but the embodiment is not limited thereto, and the light conversion unit 300 may include more than 4 accommodating parts and partition wall parts. For example, depending on the size of the light conversion unit 300, it may include tens to hundreds of accommodating parts and partition wall parts.

The base portion 350 may be disposed below the accommodating part 320. In detail, the base portion 350 may be disposed between the accommodating part 320 and the buffer layer 410. In more detail, the base portion 350 may be disposed between a lower surface of the accommodating part 320 and an upper surface of the buffer layer 410. Accordingly, the light conversion unit 300 may be adhered to the first electrode 210 through the base portion 350 and the buffer layer 410.

In addition, an adhesive layer 420 is disposed between the partition wall part 310 and the second electrode 220, and the light conversion unit 300 and the second electrode 220 may be adhered through the adhesive layer 420.

The base portion 350 is a region formed by releasing a resin material from a mold member to form the partition wall part 310 and the accommodating part 320. Accordingly, the base portion 350 may include the same material as the partition wall part 310. That is, the base portion 350 and the partition wall part 310 may be formed as one piece.

The partition wall part 310 can transmit light. Additionally, a light transmittance of the accommodating part 320 may change depending on the application of voltage.

In detail, a light conversion material 330 may be disposed inside the accommodating part 320. The light transmittance of the accommodating part 320 may be changed by the light conversion material 330. The light conversion material 330 may include light conversion particles 330b that move when voltage is applied, and a dispersion liquid 330a that disperses the light conversion particles 330b. Additionally, the light conversion material 300 may further include a dispersant that inhibits aggregation of the light conversion particles 330b.

The light conversion particles 330b inside the dispersion liquid 330a may move depending on the application of the voltage. For example, referring to FIG. 2, surfaces of the light conversion particles 330b may be negatively charged, and a positive voltage may be applied through at least one of the first electrode 210 and the second electrode 220. As a result, the light conversion particles 330b can be moved toward the first electrode 210 or the second electrode 220. Accordingly, the accommodating part 320 may become a light transmitting part.

For example, the second electrode 220 may be in a positive voltage or ground voltage state, and the first electrode 220 may have a positive voltage greater than the second electrode. As a result, the light conversion particles 330b may move toward the first electrode 210 and aggregate due to attractive force.

Accordingly, the optical path control member can be driven in a share mode.

Additionally, referring to FIG. 3, a negative voltage may be applied through at least one of the first electrode 210 and the second electrode 220. As a result, the light conversion particles 330b can be dispersed again into the dispersion liquid 330a by repulsive force. As a result, the accommodating part 320 can become a light blocking part.

Accordingly, the optical path control member can be driven in a light blocking mode (privacy mode).

The optical path control member 1000 may include a sealing part 500. In detail, referring to FIGS. 1 and 4 to 6, the optical path control member 1000 may include a sealing part 500 formed in a depth direction of the third direction 3D in the second substrate.

For example, the sealing part 500 may include a first sealing part 510 and a second sealing part 520. In detail, the first sealing part 510 may be a region into which the light conversion material is injected, and the second sealing part 520 may be a region into which the light conversion material is suctioned.

Figure 4:
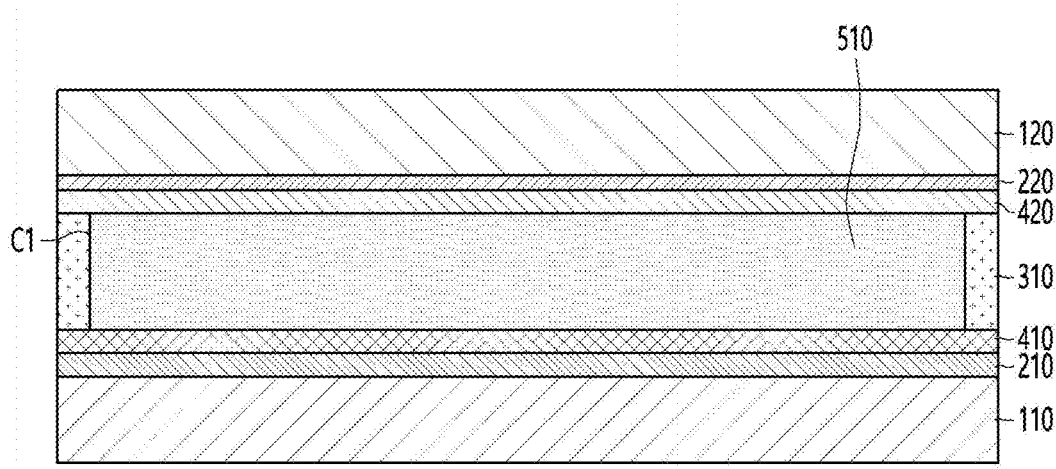
FIG. 4 is a cross-sectional view taken along a B-B' region of FIG. 1.
Figure 5:
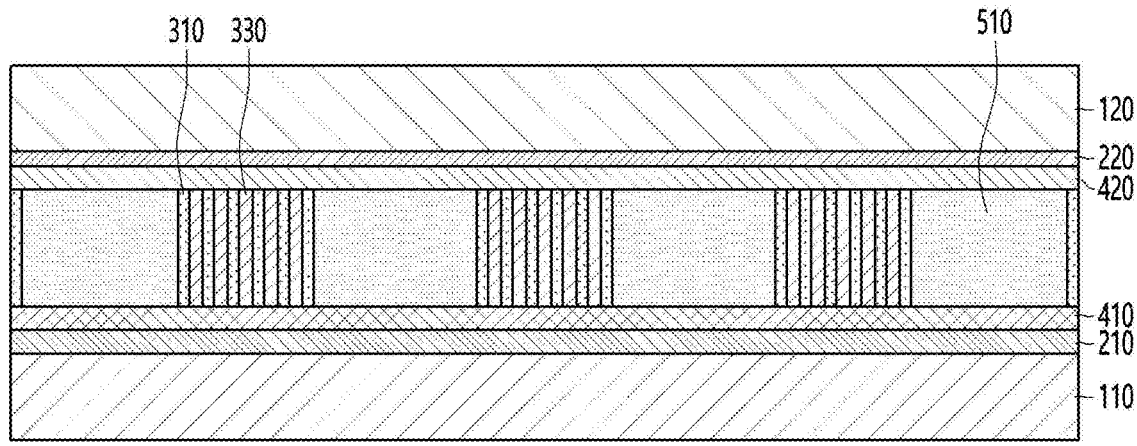
FIG. 5 is a cross-sectional view taken along a C-C' region of FIG. 1.

In detail, referring to FIGS. 4 and 5, the optical path control member 1000 may include a cutting region. In detail, the optical path control member 1000 may include a first cutting region (C1) and a second cutting region (C2).

The first cutting region (C1) and the second cutting region (C2) may be formed by cutting the second substrate 120, the second electrode 220, the adhesive layer 420, and the light conversion unit 300. The light conversion unit 300 may be cut entirely. Alternatively, the light conversion unit 300 may be partially cut.

The first cutting region (C1) may be an injection part for injecting the light conversion material 330, and the second cutting region (C2) may be a suction part for suctioning the light conversion material 330.

The light conversion material may be injected through the injection part and sucked through the suction part. Accordingly, the light conversion material may be filled within the accommodating part 320.

After filling the light conversion material, the first cutting region (C1) and the second cutting region (C2) may be filled with a sealing material. For example, the first cutting region (C1) and the second cutting region (C2) may be cleaned to remove the light conversion material remaining in the first cutting region (C1) and the second cutting region (C2). Subsequently, the first cutting region (C1) and the second cutting region (C2) may be filled with a sealing material.

Accordingly, a first sealing part 510 may be disposed in the first cutting region (C1), and a second sealing part 520 may be disposed in the second cutting region (C2).

Figure 6:
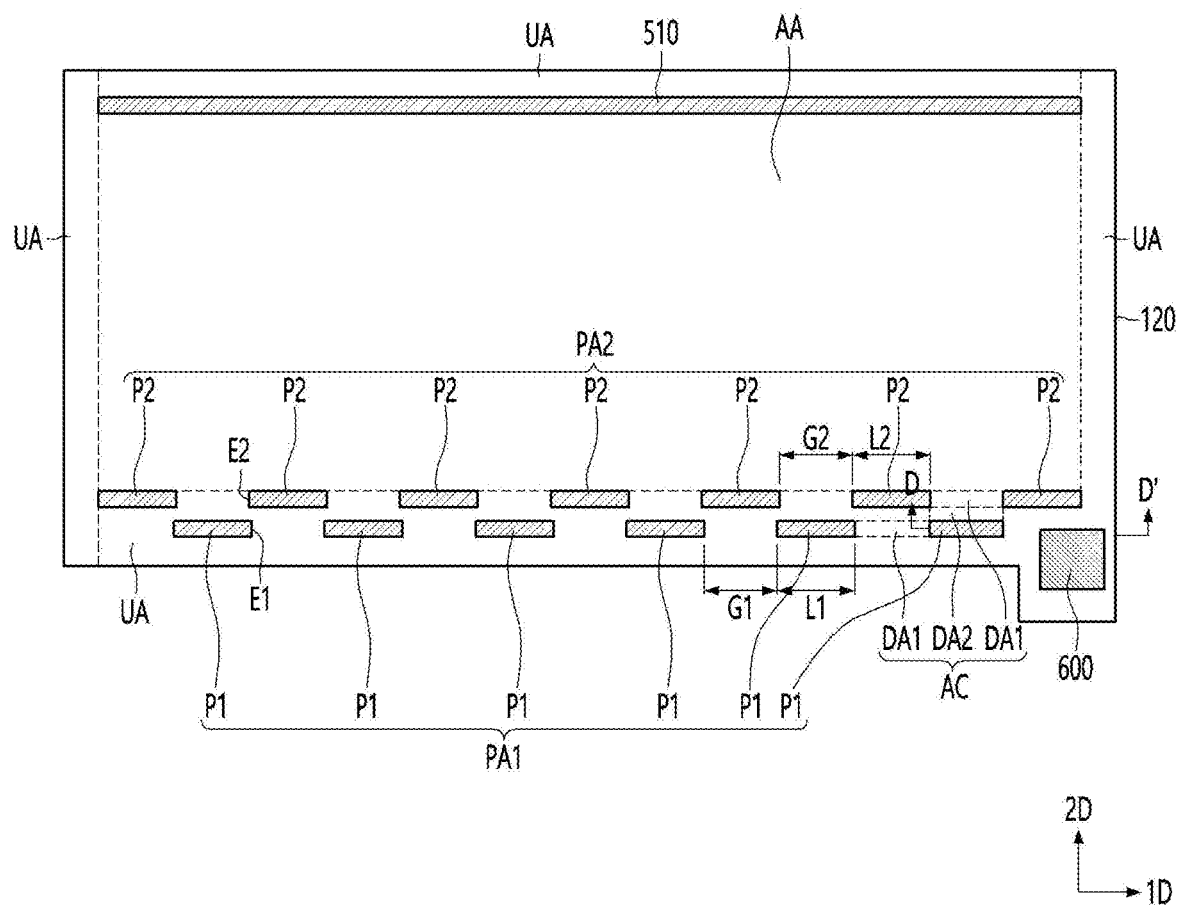
FIG. 6 is a diagram for explaining a second sealing part of an optical path control member according to an embodiment.

An effective region AA and a non-effective region UA of the optical path control member 1000 may be defined by the first sealing part 510 and the second sealing part 520. Referring to FIG. 6, the second substrate 120 of the optical path control member 1000 may include an effective region AA between the first sealing part 510 and the second sealing part 520, and a non-effective region UA other than the effective region AA. The non-effective region UA may be defined between edges of the first sealing part 510 and the optical path control member 1000 and between edges of the second sealing part 520 and the optical path control member 1000.

The effective region AA can control the light transmittance of the optical path control member by the light conversion material 330. That is, the effective region AA may be an optical path control region.

Additionally, a connection electrode 600 may be disposed in the non-effective region UA. For example, the connection electrode 600 may be disposed adjacent to the second sealing part 520. The optical path control member 1000 may be connected to an external printed circuit board through the connection electrode 600. That is, the optical path control member 1000 can receive power from the outside through the connection electrode. That is, the non-effective region UA may be a bezel region unrelated to the light path.

Meanwhile, referring to FIG. 6, the connection electrode 600 may be disposed in a protruding region of the second substrate 120. Accordingly, the second substrate 120 may include a protruding region and a non-protruding region. Therefore, since the connection electrode 600 is disposed in the protruding region, it is possible to inhibit a decrease in an area of the connection electrode due to space constraints. Additionally, the non-protruding region can be used as a space to form a display fastener, etc. As a result, overall design freedom of the display can be improved.

The optical path control member 1000 receives power through the connection electrode 600 disposed in the non-effective region UA. As a result, power can be transmitted in the effective region AA direction. Therefore, when the second sealing part 520 is formed long in the first direction 1D, a connection region between the connection electrode 600 and the second electrode 220 inside the effective region AA can be reduced. As a result, the connection characteristics of the connection electrode 600 and the second electrode 220 may be reduced. As a result, the driving characteristics of the optical path control member may be reduced.

To solve this problem, the optical path control member according to the embodiment can be formed by patterning the second sealing part 520.

Referring to FIGS. 1 and 6, the second sealing part 520 may include a plurality of patterns spaced apart from each other.

In detail, the second sealing part 520 may include a first pattern portion PA1 and a second pattern portion PA2. The first pattern portion PA1 and the second pattern portion PA2 may be arranged to be spaced apart from each other in the second direction 2D. In detail, the first pattern portion PA1 may be disposed closer to an edge of the optical path control member 1000 than the second pattern portion PA2. Alternatively, the first pattern portion PA1 may be disposed farther from the effective region AA than the second pattern portion PA2.

The first pattern portion PA1 may include a plurality of patterns. In detail, the first pattern portion PA1 may include a plurality of patterns arranged to be spaced apart from each other. For example, the first pattern portion PA1 may include a plurality of first patterns P1.

The plurality of first patterns P1 may be arranged to be spaced apart from each other. In detail, the plurality of first patterns P1 may be arranged to be spaced apart in the first direction 1D.

The first pattern P1 may have a length in the first direction 1D. For example, the first pattern P1 may have a first length L1. Additionally, the first patterns P1 may be spaced apart by a first spacing G1.

Additionally, the second pattern portion PA2 may include a plurality of patterns. In detail, the second pattern portion PA2 may include a plurality of patterns arranged to be spaced apart from each other. For example, the second pattern portion PA2 may include a plurality of second patterns P2.

The second patterns P2 may be arranged to be spaced apart from each other. In detail, the second patterns P2 may be arranged to be spaced apart in the first direction 1D.

The second pattern P2 may have a length in the first direction 1D. For example, the second pattern P2 may have a second length L2. Additionally, the second pattern P2 may be spaced apart by a second spacing G2.

The first length L1 may be the same as or different from the second length L2. Additionally, the first length L1 may be greater than or equal to the second spacing G2.

Accordingly, an end E1 of the first pattern P1 may correspond to an end E2 of the second pattern P2 in the second direction. Alternatively, the end of the first pattern P1 may overlap the second pattern P2 in the second direction.

That is, the first pattern P1 and the second pattern P2 may or may not overlap in the second direction.

The optical path control member according to the embodiment may include the second sealing part 520 that seals the light conversion material. The second sealing part 520 may include a first pattern portion PA1 and a second pattern portion PA2 spaced apart in the first direction 1D and the second direction 2D. Accordingly, a conduction region AC of the connection electrode CA disposed in the non-effective region UA and the second electrode 220 disposed in the effective region AA may increase. That is, a first separation region DA1 in which patterns of the first pattern portion PA1 and the second pattern portion PA2 are spaced apart in the first direction, and a second separation region DA2 in which patterns of the first pattern portion PA1 and the second pattern portion PA2 are spaced apart in the second direction, may be formed as a conductive region.

That is, while sealing the light conversion material disposed inside the accommodating part 320 by the second sealing part 520, the conduction region in which the second electrode and the connection electrode are connected can be increased.

Accordingly, since the conduction region of the connection electrode and the second electrode is increased, power transmitted from the outside can be quickly transmitted from the non-effective region to the effective region. Accordingly, the driving characteristics of the optical path control member can be improved.

Additionally, even if the connection electrode is formed at various positions, the second electrode and the connection electrode can be easily connected to electricity. As a result, the degree of freedom in the position of the connection electrode can be improved.

Meanwhile, since the second sealing part 520 includes a first pattern portion PA1 and a second pattern portion PA2, the length of the light conversion material 330 disposed inside the accommodating part 320 may vary.

Figure 7:
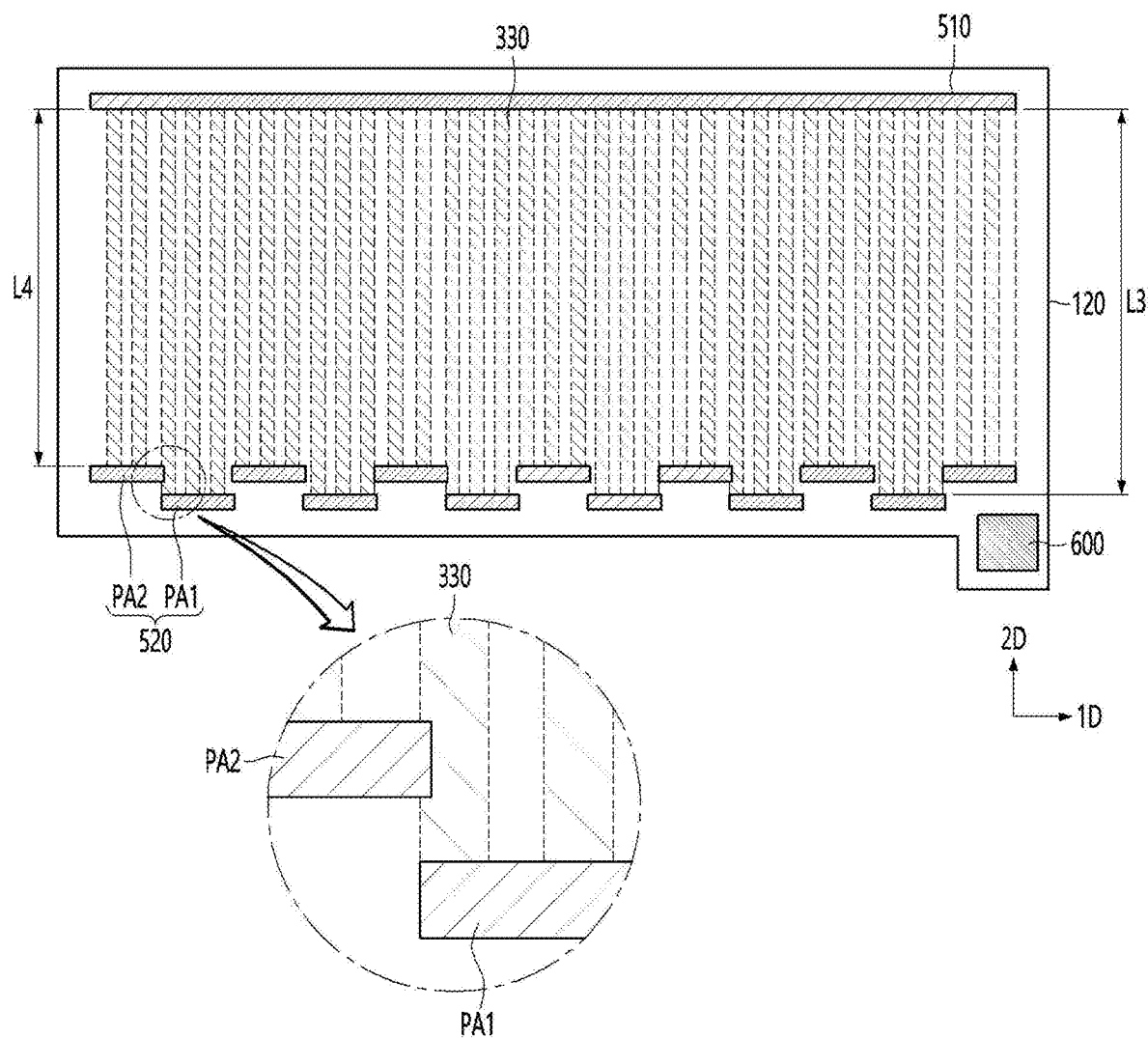
FIG. 7 is a diagram illustrating a change in a length of an accommodating part including a light conversion material of an optical path control member according to an embodiment.

In detail, referring to FIG. 7, a length L3 of the light conversion material 33 of the accommodating part 320 sealed by the first pattern portion PA1 may be different from a length L4 of the light conversion material 330 of the accommodating part 320 sealed by the second pattern portion PA2. In detail, the length L3 of the light conversion material 330 may be longer than the length L4 of the light conversion material 330.

That is, the first pattern portion PA1 is disposed farther from the effective region AA than the second pattern portion PA2. Accordingly, the length L3 of the light conversion material 330 may be longer than the length L4 of the light conversion material 330 by the spacing of the first pattern portion PA1 and the second pattern portion PA2 in the second direction.

Since a filling length of the light conversion material disposed inside the accommodating part varies depending on the pattern portion to be sealed, the sealing characteristics of the optical path control member can be improved. That is, even if the light conversion material sealed by the second pattern portion PA2 flows out of the accommodating part, the light conversion material can be inhibited from leaking out of the optical path control member by the first pattern portion PA1. Accordingly, the sealing characteristics of the optical path control member can be improved.

Meanwhile, part or all of the second substrate 120, the second electrode 220, and the light conversion unit 300 may be cut to form a cutting region, and a conductive material may be filled inside of the cutting region. As a result, the connection electrode 600 can be formed and disposed on the second substrate 120.

Figure 8:
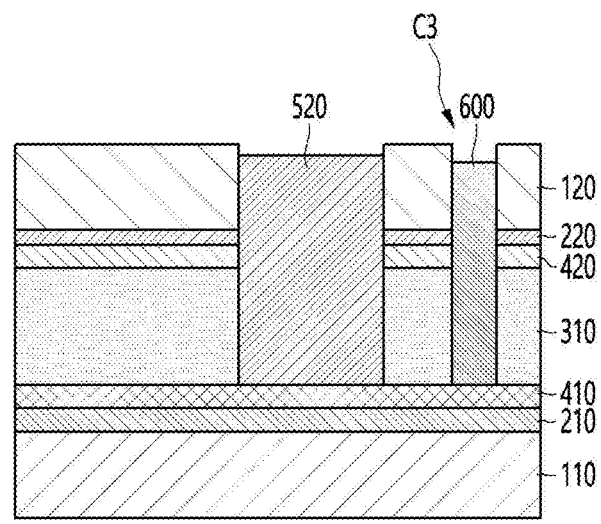
FIG. 8 is a cross-sectional view taken along a D-D' region of FIG. 6.

For example, referring to FIGS. 6 and 8, the optical path control member may include a third cutting region C3. In detail, the optical path control member may include a third cutting region C3 formed by cutting the second substrate 120, the second electrode 220, and the light conversion unit 300.

The inside of the third cutting region C3 is filled with a conductive material, thereby forming the connection electrode 600. The connection electrode 600 may be electrically connected to the second electrode 220 within the third cutting region C3.

The second sealing part 520 may be patterned into various shapes and sizes.

Figure 9:
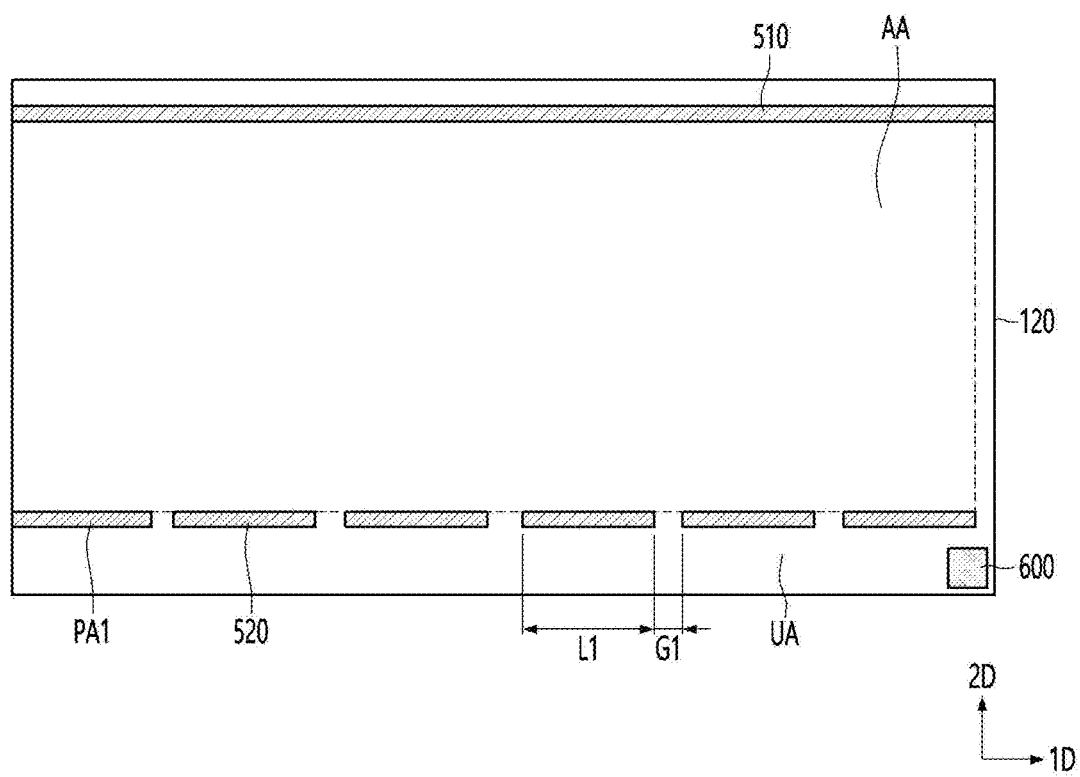
FIGS. 9 to 11 are diagrams for explaining various arrangements of a second sealing part of an optical path control member according to an embodiment.
Figure 10:
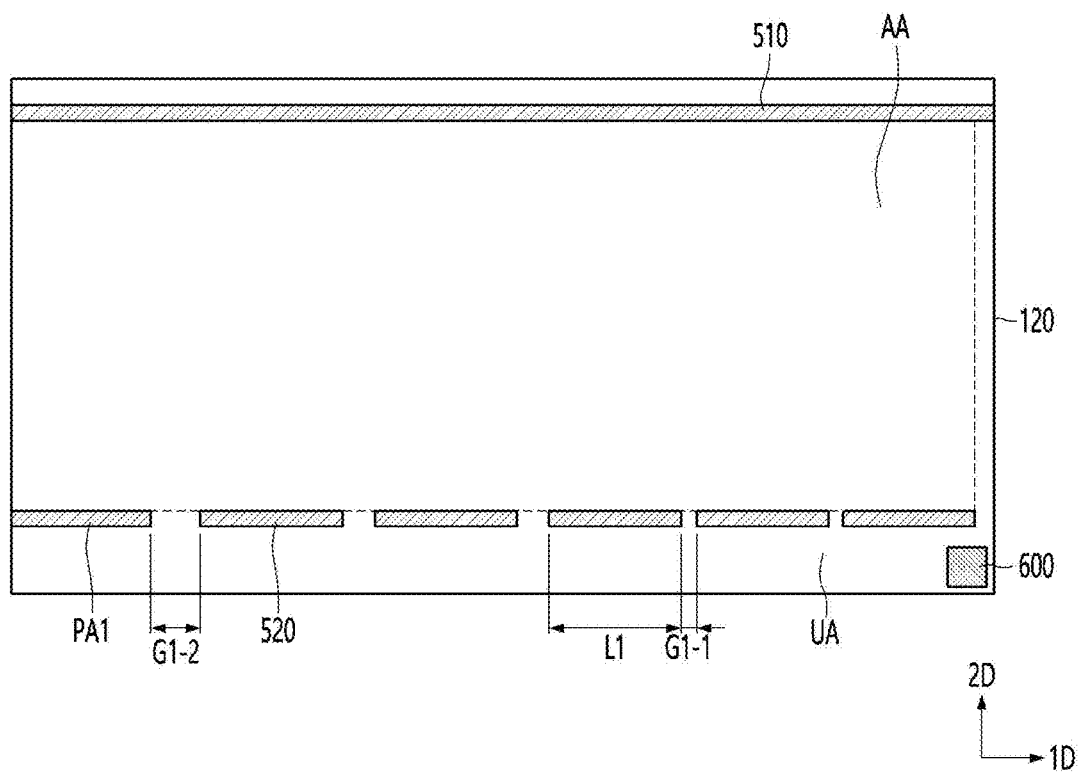
Figure 11:
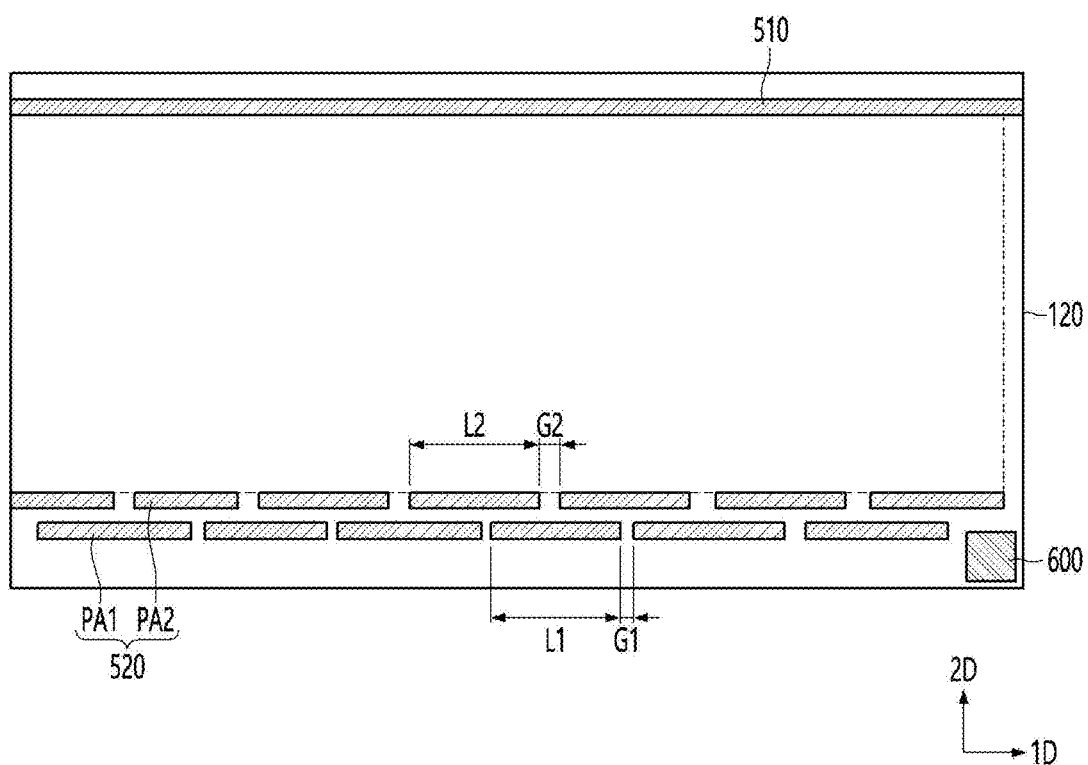

FIGS. 9 to 11 are top views of the second substrate 120 to explain the shape of the second sealing part 520.

Referring to FIG. 9, the second sealing part 520 may include only the first pattern portion PA1. In detail, the second sealing part 520 may include a first pattern portion PA1 including first patterns P1.

The first patterns P1 may be arranged to be spaced apart from each other. At this time, a first length L1 of the first pattern P1 may be different from a first spacing G1 of the first pattern P1. In detail, the first length L1 of the first pattern P1 may be greater than the first spacing G1 of the first pattern P1.

At this time, one end and the other end of the first pattern P1 may be disposed at a position overlapping with the partition wall part 310 of the light conversion unit 300. Accordingly, the light conversion material 300 inside the accommodating part 320 can be sealed by the first pattern portion PA1.

Referring to FIG. 10, the second sealing part 520 may include only the first pattern portion PA1. In detail, the second sealing part 520 may include a first pattern portion PA1 including first patterns P1.

The first patterns P1 may be arranged to be spaced apart from each other. At this time, the first length L1 of the first pattern P1 may be different from the spacing of the first pattern P1.

Additionally, the spacing of the first pattern P1 may vary depending on a position of the connection electrode CA. In detail, the spacing of the first pattern P1 may vary depending on a distance from the connection electrode CA.

For example, the spacing of the first pattern P1 may include a 1-1 spacing G1-1 and a 1-2 spacing G1-2 defined according to the distance from the connection electrode. The 1-1 spacing G1-1 may be closer to the connection electrode CA in the first direction 1D than the 1-2 spacing G1-2.

The 1-1 spacing G1-1 and the 1-2 spacing G1-2 may be different from each other. In detail, the 1-1 spacing G1-1 may be smaller than the 1-2 spacing G1-2. In more detail, the first spacing G1 may increase as it moves away from the connection electrode CA in the first direction 1D.

Accordingly, a moving speed of the voltage moving to the conductive region between the first patterns P1 can be made uniform. That is, the first spacing of a region far from the connection electrode CA is made larger than the first spacing of a region close to the connection electrode CA, thereby reducing the difference in voltage movement between the region far from the connection electrode CA and the region close to the connection electrode CA. Therefore, the moving speed of the voltage applied to each accommodating part of the optical path control member can be made uniform. As a result, the driving characteristics of the optical path control member can be improved.

Referring to FIG. 11, the second sealing part 520 may include a first pattern portion PA1 and a second pattern portion PA2. In detail, the second sealing part 520 may include a first pattern portion PA1 including the first pattern P1 and a second pattern portion PA2 including the second pattern P2.

The first patterns P1 may be arranged to be spaced apart from each other. At this time, the first length L1 of the first pattern P1 may be different from the first spacing G1 of the first pattern P1. In detail, the first length L1 of the first pattern P1 may be greater than the first spacing G1 of the first pattern P1.

Additionally, the second patterns P2 may be arranged to be spaced apart from each other. At this time, the second length L2 of the second pattern P2 may be different from the second spacing G2 of the second pattern P2. In detail, the second length L2 of the second pattern P2 may be larger than the second spacing G2 of the second pattern P2.

Additionally, the first pattern P1 and the second pattern P2 may be arranged to overlap each other. That is, the first pattern P1 and the second pattern P2 may be disposed to partially overlap in the second direction 2D. For example, the first pattern P1 may partially overlap the second pattern P2 in the second direction 2D. Additionally, the second pattern P2 may partially overlap the first pattern P1 in the second direction 2D. At this time, a region of the first pattern P1 overlapping with the second pattern P2 may be greater than a region of the first pattern P1 that does not overlap with the second pattern P2. Additionally, a region of the second pattern P2 overlapping with the first pattern P1 may be greater than a region of the second pattern P2 that does not overlap with the first pattern P1.

The optical path control member according to the embodiment may improve sealing characteristics by arranging the patterns of the first pattern portion PA1 and the second pattern portion PA2 to overlap in a second direction. That is, even if the light conversion material sealed by the second pattern portion PA2 flows out of the accommodating part, the light conversion material is additionally sealed by the first pattern portion PA1 overlapping with the first pattern portion PA1, and accordingly, the sealing properties of the light conversion material can be improved. That is, since two sealing parts spaced apart in the second direction are arranged in one accommodating part, the sealing characteristics of the optical path control member can be improved.

Meanwhile, the optical path control member according to the embodiment may further include a third sealing part 530 and a fourth sealing part 540.

Figure 12:
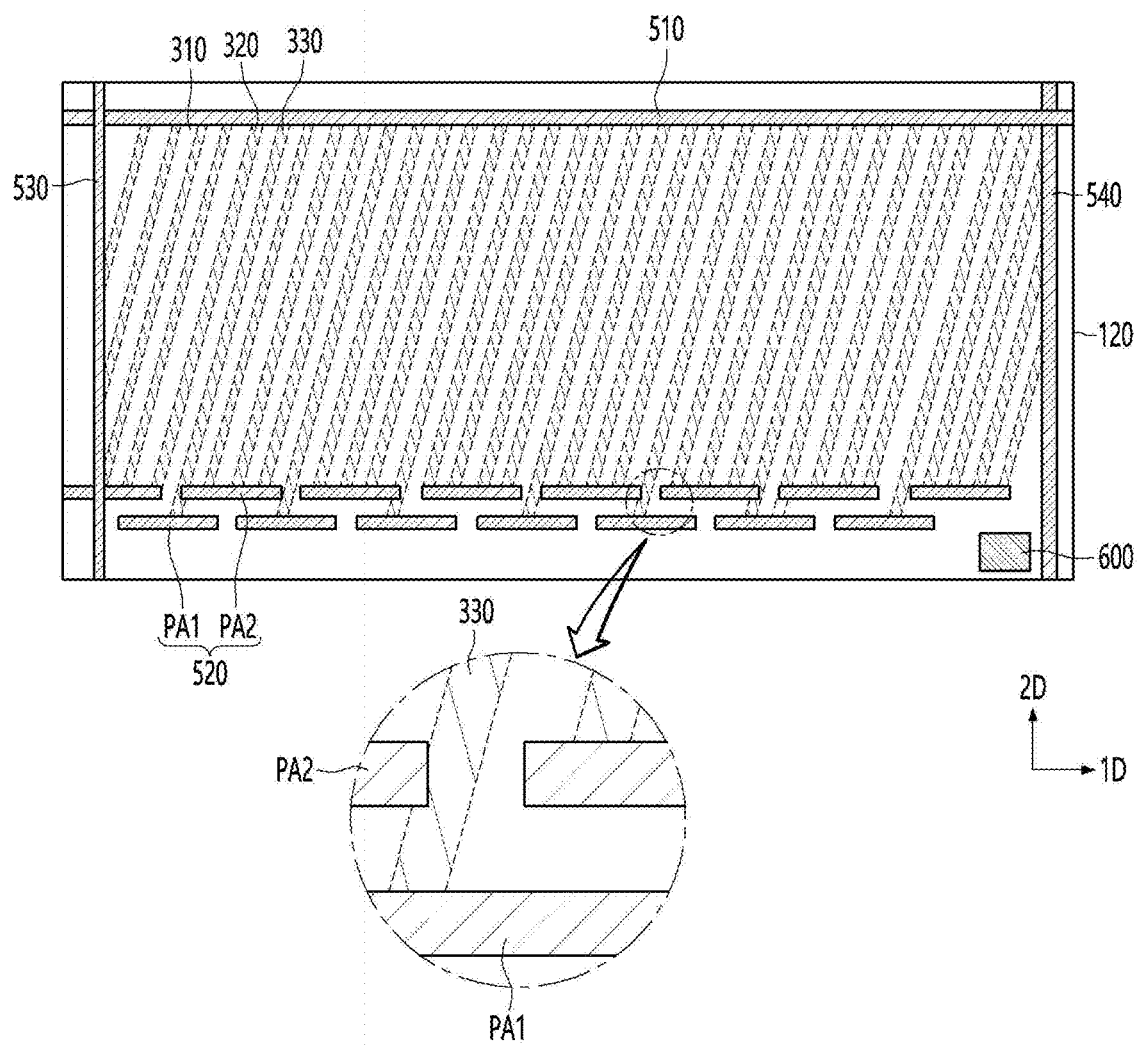
FIG. 12 is a diagram for explaining a third sealing part and a fourth sealing part of an optical path control member according to an embodiment.

Referring to FIG. 12, the partition wall part 310 and the accommodating part 320 may be formed by tilting at a certain inclination angle. Additionally, a third sealing part 530 and a fourth sealing part 540 may be disposed to seal one end and the other end of the accommodating part 320.

For example, the accommodating part 320 may be tilted and extended in a direction between the first direction 1D and the second direction 2D. Additionally, a third sealing part 530 and a fourth sealing part 540 extending in the second direction 2D may be disposed to seal one end and the other end of the accommodating part 320.

The third sealing part 530 and the fourth sealing part 540 may be formed by forming a cutting region extending in the longitudinal direction of the second direction corresponding to the first sealing part 510 and the second sealing part 520 described above and disposing a sealing material on the cutting region.

Additionally, the third sealing part 530 and the fourth sealing part 540 may include the same or similar materials as the first sealing part 510 and the second sealing part 520 described above.

Meanwhile, as described above, since the second sealing part 520 is formed by patterning, the connection electrode CA is not limited to a position within the non-effective region and can be disposed at various positions.

Figure 13:
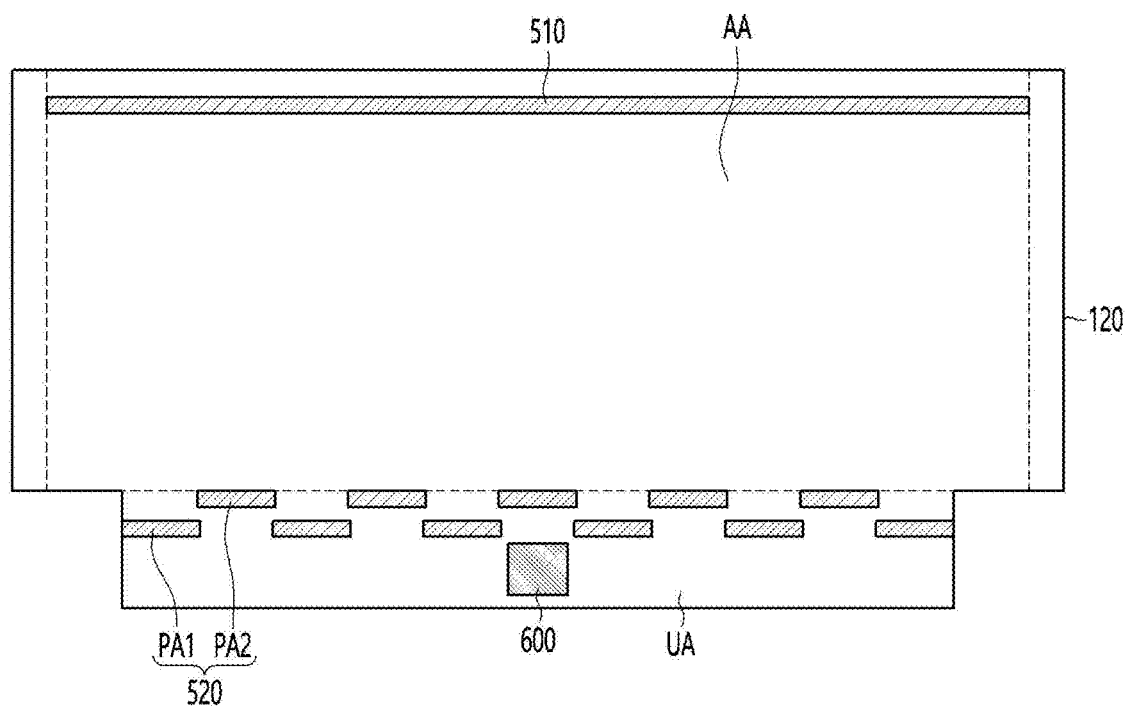
FIG. 13 is a diagram for explaining a position of a connection electrode of an optical path control member according to an embodiment.

Referring to FIG. 13, the connection electrode CA may be disposed in a central region of the non-effective region UA. The second sealing part 520 may be patterned to form a plurality of conduction regions. Accordingly, even if the connection electrode CA is disposed in the central region of the non-effective region UA, power can be easily transmitted to the second electrode 220 of the effective region AA.

Accordingly, a corner region of the optical path control member 100 can be removed. That is, some of the regions at both ends of the non-effective region UA can be removed.

Accordingly, a space can be formed through the removed region of the optical path control member to easily attach another functional member (e.g., a fastening part) to the display device (e.g. laptop or vehicle) to which the optical path control member is attached. For example, a hinge may be formed in the removed region to connect a monitor unit and a main body unit of the laptop. Through this, the laptop to which the optical path control member 1000 is attached does not need to form a non-effective region (UA) caused by the optical path control member separately from the non-effective region of the laptop's display. Therefore, the bezel region of the laptop can be reduced, thereby widening the effective region of the laptop.

Accordingly, a space in which other functional members can be easily combined with the optical path control member can be formed. For example, a fastening member capable of fastening the optical path control member to another member may be coupled to the removed region. The optical path control member 1000 can be easily detached from other members by the fastening member. Accordingly, convenience for use of the optical path control member can be improved.

Hereinafter, referring to FIGS. 14 to 18, a display device to which an optical path control member according to an embodiment is applied will be described.

Figure 14:
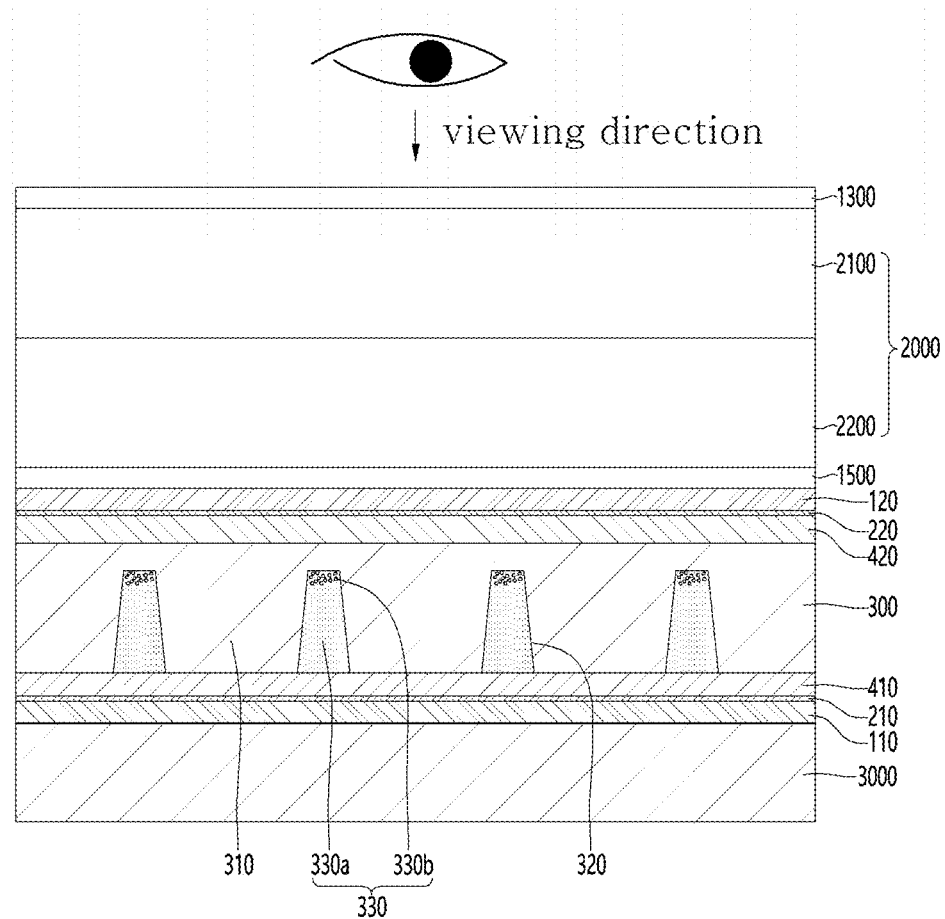
FIGS. 14 and 15 are cross-sectional views of a display device to which an optical path control member according to an embodiment is applied.
Figure 15:
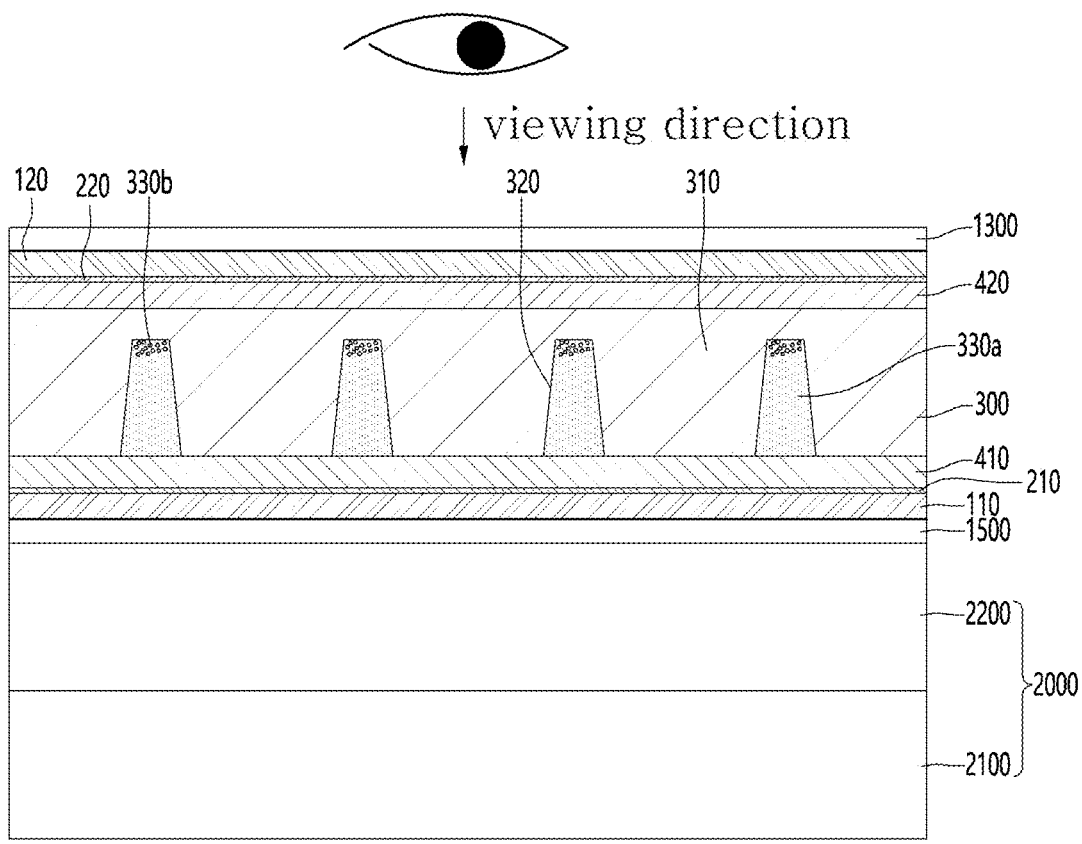

Referring to FIGS. 14 and 15, an optical path control member 1000 according to an embodiment may be disposed on or under a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

The display panel 2000 may include a first base substrate 2100 and a second base substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first base substrate 2100 including a thin film transistor (TFT) and a pixel electrode and the second base substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first base substrate 2100 and the second base substrate 2200 is bonded to the first base substrate 2100 with the liquid crystal layer interposed therebetween. That is, a thin film transistor may be formed on the first base substrate 2100, a protective film may be formed on the thin film transistor, and a color filter layer may be formed on the protective film. In addition, a pixel electrode in contact with the thin film transistor may be formed on the first base substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 14, the optical path control member may be disposed under the liquid crystal panel and on the backlight unit 3000, and the optical path control member may be disposed between the backlight unit 3000 and the display panel 2000.

Alternatively, as shown in FIG. 15, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first base substrate 2100, and an organic light emitting element in contact with the thin film transistor may be formed. The organic light emitting element may include an anode, a cathode, and an organic light emitting layer formed between the anode and the cathode. In addition, the second base substrate 2200 configured to function as an encapsulation substrate for encapsulation may be further included on the organic light emitting element.

That is, light emitted from the display panel 2000 or the backlight unit 3000 may move from the first substrate 110 to the second substrate 120 of the optical path control member.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection inhibiting polarizing plate.

In addition, an additional functional layer 1300 such as an anti-reflection layer, an anti-glare, or the like may be further disposed on the optical path control member 1000.

Further, a touch panel may be further disposed between the display panel and the optical path control member.

In addition, it is shown in the drawings that the light conversion unit of the optical path control member according to the embodiment is in a direction parallel or perpendicular to an outer surface of the second substrate, but the light conversion unit is formed to be inclined at a predetermined angle from the outer surface of the second substrate. Through this, a moire phenomenon occurring between the display panel and the optical path control member may be reduced.

Figure 18:
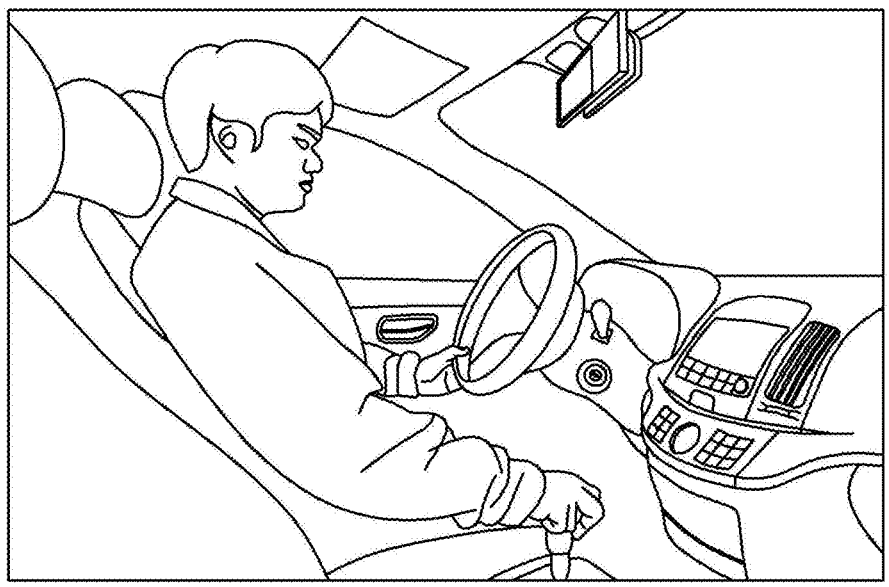

Referring to FIGS. 16 to 18, an optical path control member according to an embodiment may be applied to various display devices.

Referring to FIGS. 16 to 18, the optical path control member according to the embodiment may be applied to a display device that displays a display.

For example, when power is applied to the optical path control member as shown in FIG. 16, the accommodating part functions as the light transmitting part, so that the display device may be driven in the public mode, and when power is not applied to the optical path control member as shown in FIG. 17, the accommodating part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 18, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
a first substrate;
a first electrode disposed on the first substrate;
a second substrate disposed on the first substrate;
a second electrode disposed under the second substrate;
a light conversion unit disposed between the first electrode and the second electrode;
a first sealing part formed in a first cutting region formed by cutting the second substrate, the second electrode, and the light conversion unit, and a second sealing part formed in a second cutting region; and
a connection electrode disposed adjacent to the second sealing part,
wherein the second sealing part includes a plurality of patterns spaced apart from each other,
wherein the light conversion unit includes a plurality of partition wall parts and a plurality of accommodating parts disposed between adjacent partition wall parts,
wherein a length of at least one of the plurality of accommodating parts is different from a length of at least another of the plurality of accommodating parts.

2. The optical path control member of claim 1, wherein the second substrate includes an effective region between the first sealing part and the second sealing part, and a non-effective region other than the effective region, and
wherein the connection electrode is disposed in the non-effective region.

3. The optical path control member of claim 2, wherein the second substrate is defined by a first direction in a longitudinal direction, a second direction in a width direction, and a third direction in a thickness direction,
wherein the second sealing part includes a first pattern portion and a second pattern portion spaced apart in the second direction,
wherein the first pattern portion includes a plurality of first patterns spaced apart from each other, and
wherein the second pattern portion includes a plurality of second patterns spaced apart from each other.

4. The optical path control member of claim 3, wherein the first pattern portion is disposed farther from the effective region than is the second pattern portion.

5. The optical path control member of claim 3, wherein the first pattern portion partially overlaps the second pattern portion in the second direction.

6. The optical path control member of claim 3, wherein a length of each first pattern is greater than a spacing between adjacent first patterns of the first pattern portion, and
wherein a length of the second pattern is greater than a spacing between adjacent second patterns of the second pattern portion.

7. The optical path control member of claim 2, wherein the second substrate is defined by a first direction in a longitudinal direction, a second direction in a width direction, and a third direction in a thickness direction, and
wherein the second sealing part includes a plurality of patterns disposed to be spaced apart in the first direction.

8. The optical path control member of claim 7, wherein a spacing of the plurality of patterns increases as a distance from the connection electrode increases.

9. The optical path control member of claim 1,
wherein each of the plurality of accommodating parts includes a dispersion liquid and a light conversion material containing light conversion particles dispersed in the dispersion liquid.

10. A display device comprising:
a panel including at least one of a display panel and a touch panel; and
the optical path control member of claim 1, which is disposed on or under the panel.

11. An optical path control member comprising:
a first substrate;
a first electrode disposed on the first substrate;
a light conversion unit disposed on the first electrode;
a second electrode disposed on the light conversion unit;
a second substrate disposed on the second electrode;
a first sealing part formed in a first cutting region formed by cutting one end of each of the second substrate, the second electrode, and the light conversion unit; and
a second sealing part formed in a second cutting region formed by cutting other end of each of the second substrate, the second electrode, and the light conversion unit,
wherein the first sealing part and the second sealing part have different lengths,
wherein the second substrate is defined by a first direction in a longitudinal direction, a second direction in a width direction, and a third direction in a thickness direction,
wherein the second sealing part includes a first pattern portion and a second pattern portion spaced apart in the second direction,
wherein the first pattern portion includes a plurality of first patterns spaced apart from each other in the first direction, and
wherein the second pattern portion includes a plurality of second patterns spaced apart from each other in the first direction.

12. The optical path control member of claim 11, wherein the second sealing part includes a plurality of sealing patterns spaced apart from each other.

13. The optical path control member of claim 12, comprising:
a connection electrode disposed adjacent to the second sealing part,
wherein the second substrate includes an effective region between the first sealing part and the second sealing part, and a non-effective region other than the effective region, and
wherein the connection electrode is disposed in the non-effective region.

14. The optical path control member of claim 13, wherein the plurality of first patterns and the plurality of second patters include a portion overlapping in the second direction.

15. The optical path control member of claim 14, wherein the first pattern portion is disposed farther from the effective region than is the second pattern portion.

16. The optical path control member of claim 14, wherein the first pattern portion partially overlaps the second pattern portion in the second direction.

17. The optical path control member of claim 14, wherein a length of each first pattern is greater than a spacing between adjacent first patterns of the first pattern portion, and
wherein a length of each second pattern is greater than a spacing between adjacent second patterns of the second pattern portion.

18. The optical path control member of claim 13, wherein the light conversion unit includes a plurality of partition wall parts and a plurality of accommodating parts disposed between adjacent partition wall parts,
wherein the accommodating part includes a dispersion liquid and a light conversion material containing light conversion particles dispersed in the dispersion liquid, and
wherein a length of one accommodating part among the plurality of accommodating parts is different from a length of another accommodating part.

19. The optical path control member of claim 18, wherein the first pattern portion is spaced farther from the first sealing part than the second pattern portion, and
wherein a length of an accommodating part in contact with the first pattern portion is greater than a length of an accommodating part in contact with the second pattern portion.

20. An optical path control member comprising:
a first substrate;
a first electrode disposed on the first substrate;
a light conversion unit disposed on the first electrode;
a second electrode disposed on the light conversion unit;
a second substrate disposed on the second electrode;
a first sealing part formed in a first cutting region formed by cutting one end of each of the second substrate, the second electrode, and the light conversion unit; and
a second sealing part formed in a second cutting region formed by cutting other end of each of the second substrate, the second electrode, and the light conversion unit,
wherein the first sealing part and the second sealing part have different lengths,
wherein the second substrate is defined by a first direction in a longitudinal direction, a second direction in a width direction, and a third direction in a thickness direction,
wherein the second sealing part includes a plurality of patterns disposed to be spaced apart in the first direction, and
wherein a spacing of the plurality of patterns increases as a distance from the connection electrode increases.

* * * * *